United States Patent [19]

Tomita

[11] Patent Number: 5,121,070
[45] Date of Patent: Jun. 9, 1992

[54] PHASE DEMODULATOR FOR PSK-MODULATED SIGNALS

[75] Inventor: Hideho Tomita, Tokyo, Japan
[73] Assignee: NEC Corporation, Tokyo, Japan
[21] Appl. No.: 733,778
[22] Filed: Jul. 22, 1991
[30] Foreign Application Priority Data
  Jul. 20, 1990 [JP] Japan ............... 2-191966
[51] Int. Cl.$^5$ ............... H03D 3/00
[52] U.S. Cl. ............... 329/304; 329/307; 329/310; 375/85
[58] Field of Search ............... 332/304, 306, 307, 310; 375/52, 53, 83, 85; 178/66.2

[56] References Cited

U.S. PATENT DOCUMENTS 3,997,847 12/1976 Tong ............... 329/310 X

Primary Examiner—Robert J. Pascal
Attorney, Agent, or Firm—Sughrue, Mion, Zinn, Macpeak & Seas

[57] ABSTRACT

A phase demodulator for directly demodulating carrier PSK signals, PSK-modulated with digital signals, without using any analog circuit. Where the invention is applied to a demodulator of the different detection type, the baud timing signal is converted into a synchronous band timing signal, synchronized with the first leading edge of the PSK signals converted into "1" or "0" in logical level. Meanwhile, the ring oscillator generates signals of a frequency substantially equal to the carrier frequency of the PSK signals, and generates outputs at N taps. the outputs obtained at the N taps have a $2\pi/N$ phase difference between every pair of mutually adjoining taps, and are latched with the synchronous baud timing signal in each baud period. The point at which the logical level of mutually adjoining latch outputs varies from "1" to "0" is the phase information of said digital signals. The corresponding phase information is encoded to constitute the demodulated output. In a demodulator of the synchronous detection type, meanwhile, the latch outputs are used as said phase information like in the case of the differential detection type. The reference phase of the PSK signals is fixed by subtracting from this phase information the offset phase, which is the output of the synchronous phase fixing circuit.

20 Claims, 4 Drawing Sheets

FIG.1
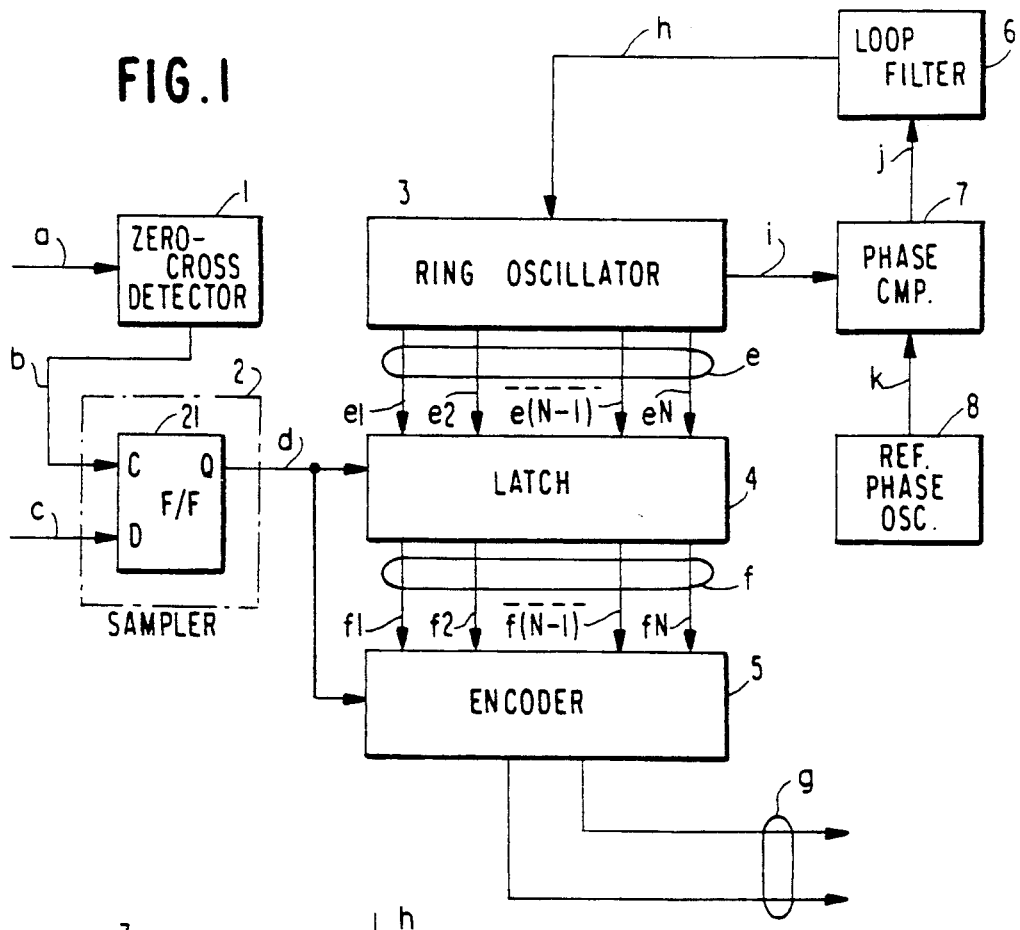
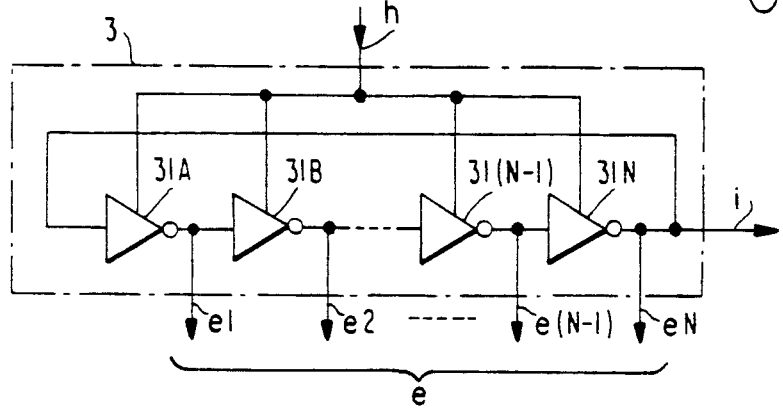
FIG.3
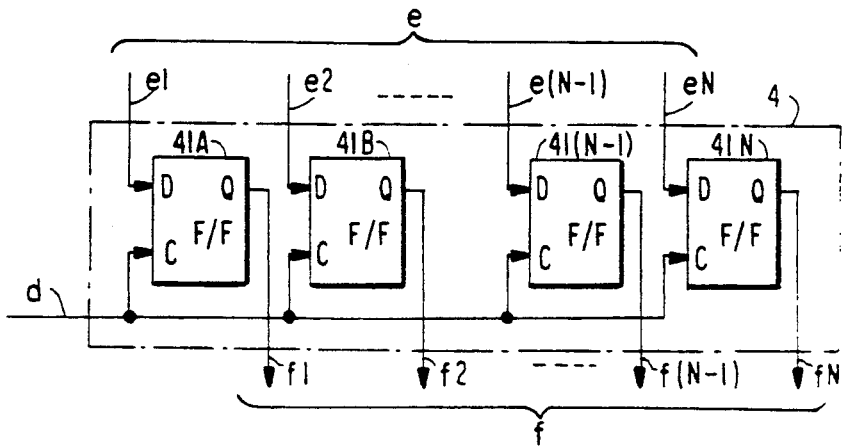
FIG.4

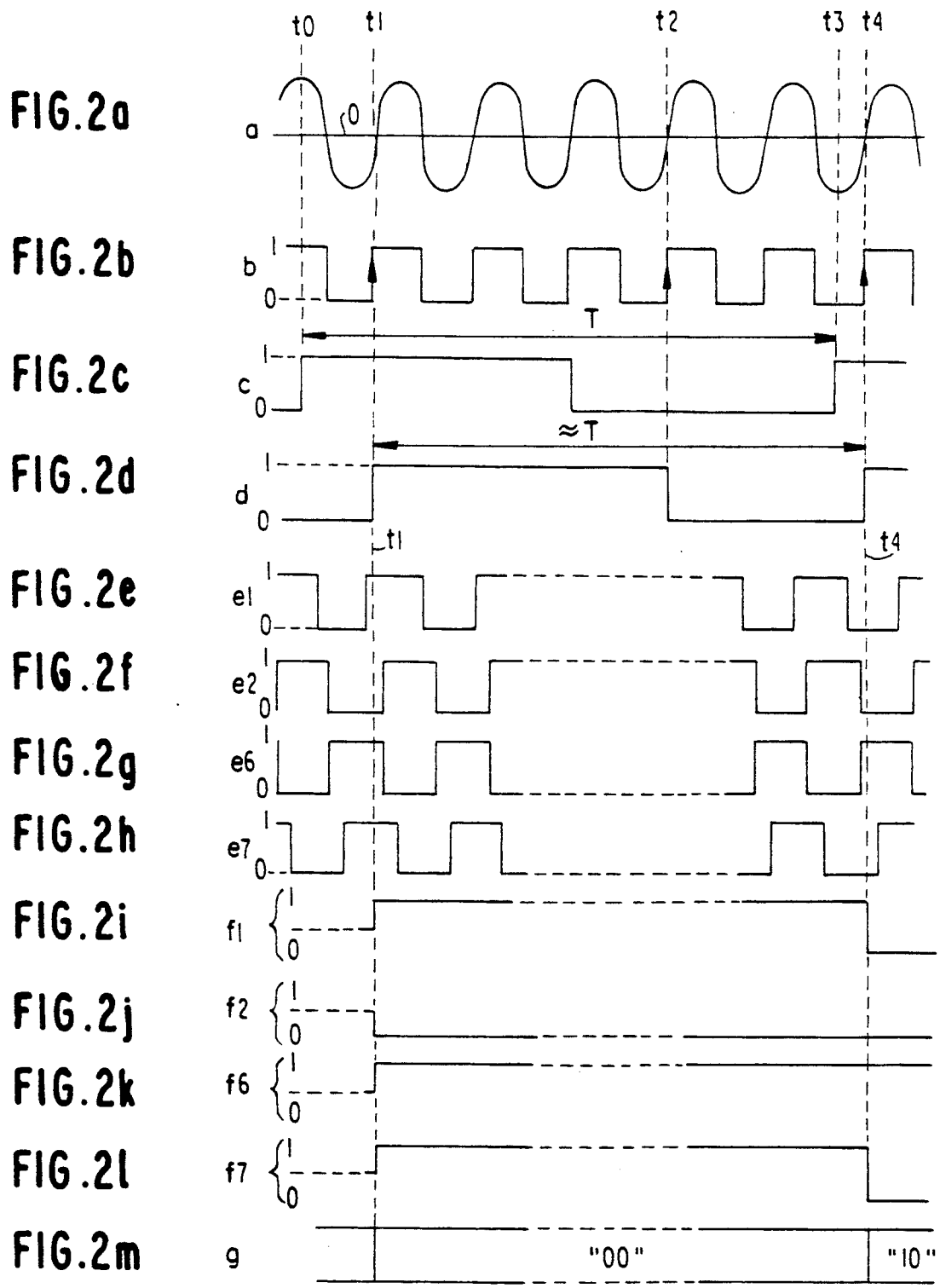

PHASE DEMODULATOR FOR PSK-MODULATED SIGNALS

BACKGROUND OF THE INVENTION

1. Field of the Invention

The present invention relates to a phase demodulator for demodulating a carrier phase-modulated with digital signals (PSK signals) into digital data.

2. Description of the Prior Art

In one example of phase demodulator for demodulating PSK signals by the prior art, the input PSK signals are once frequency-converted into intermediate frequency (IF) signals. The IF signals are converted by an analog phase demodulating circuit into baseband signals, which are then converted into digital signals. The digital signals are phase demodulated by digital signal processing. Such a phase demodulator is not only difficult to be built compactly because of the complex configuration, but also has the additional disadvantage of involving many circuit components requiring adjustment.

Another example of phase demodulator by the prior art derives directly, instead of going via analog demodulating means, digital data from IF signals converted from PSK signals as described in the U.S. patent application Ser. No. 07/629,546 (Filing Date: Dec. 18, 1990) and the European Patent Application No. 90,313,815.4 (Filing Date: Dec. 18, 1990) both by the same applicant as that of the present application. This phase demodulator is provided with a zero-cross detector for detecting the zero-cross point of the input PSK signals and generating a zero-cross detection signal. The zero-cross detection signal is supplied to a synchronizing circuit, and converts baud timing signals extracted from IF signals, which are another input to the synchronizing circuit, into synchronous baud timing signals. Meanwhile, a counter connected to an oscillator for generating clock pulses of a predetermined frequency counts the clock pulses, and outputs the count as instantaneous phase information. This counter operates as a reference phase generator. A phase comparator is responsive to the output of the counter and synchronous baud timing signals to generate a digital signal representing the phase difference between the mutually adjoining two baud periods. A decision circuit receiving the phase difference generates a demodulated output corresponding to the phase region of the phase difference.

The second of the prior art phase demodulators referred to above, which phase-demodulates PSK signals with a digital circuit without relying on analog phase demodulating means, has the advantage of permitting ready circuit integration, and is suitable for use in a portable radio apparatus or the like, which is required to be compact and to be less power consumption. The absence of the need to adjust circuit components is another advantage. However, the counter for counting clock pulses involves a shortcoming in high speed operation, and therefore is inevitably limited to some extent in the demodulation of high speed digital data. The fastest operation speed of the state of the art counter using a CMOS technology is about 30 MHz. Now assuming that the number of phase discrimination levels of the prior art demodulator is 32, the maximum carrier frequency of an input PSK signal is limited to about 1 MHz.

BRIEF SUMMARY OF THE INVENTION

Objects of the Invention

A first object of the present invention is to provide a phase demodulator for PSK signals of either the differential detection type or the synchronous detection type, which is compact, weighs less and requires no adjustment.

A second object of the invention is to provide a phase demodulator of this kind structured as a digital circuit.

A third object of the invention is to provide a phase demodulator for PSK signals, suitable for the demodulation of high speed digital data.

Summary of the Invention

A phase demodulator of the differential detection type is provided with a zero-cross detector into which PSK signals of either the high frequency or the intermediate frequency (IF) band are entered. This zero-cross detector detects the zero-cross point of the PSK signals, and generates a zero-cross detection signal. A sampler receiving the zero-cross detection signal is also supplied with the phase transition point of the PSK signals, i.e. a baud timing signal indicating the baud timing of digital signals, and generates a synchronous baud timing signal synchronized with said zero-cross detection signal. Meanwhile, a reference oscillator for generating reference synchronizing pulses, whose repetition frequency is approximately equal to the carrier frequency of said PSK signals, supplies the reference synchronizing pulses to a ring oscillator. The ring oscillator is provided with N (N is a plural number) stages of delay elements connected in a ring form, and generates synchronizing pulses synchronized with the reference synchronizing pulses. The ring oscillator supplies N tap outputs, each pair of mutually adjoining taps having the same phase difference of $2\pi/N$, to a latch connected to the taps. The latch latches one of the tap outputs in response to the synchronous baud timing signal. Here the tap outputs are arranged in such a sequence that they be outputted with a phase difference of $2\pi/N$ between two adjoining outputs, and each serves as relative phase information of the synchronous baud timing signal. Where latch outputs are sequentially arranted corresponding to the tap outputs, there is one point at which the logical level of mutually adjoining latch outputs varies from "1" to "0". Therefore, by detecting this logical level transition point, the modulating phase of the input PSK signals is identified with a phase discrimination of $2\pi/N$. A first encoder connected to said latch determines first the phase of the PSK signal in a first baud period, then that of the PSK signal in a second baud period following the first, and further the phase difference of the PSK signals in the first and second baud periods. Finally, the first encoder determines the phase difference of the PSK signal per baud period on the basis of the signal indicating the phase difference in every baud period, and supplies it as a demodulated output.

A phase demodulator of the synchronous detection type processes signals in the same way as that of the differential detection type up to where a latch output is obtained. A second encoder connected to the latch determines a "tentative demodulation phase" of the input PSK signal in the baud period in which this latch output is obtained from the logical level varying point indicating signal of the latch output. A subtracter connected to the first encoder subtracts an offset phase, which is the regular phase error portion of the demodulation phase, from this "tentative demodulation phase", and takes out a demodulated signal for which the reference phase of the PSK signal has been determined. A decision circuit connected to the subtracter determines the demodulation phase region of the PSK signal from the demodulated signal, and achieves demodulation accordingly. Meanwhile, the offset phase is generated from the demodulated signal by synchronous phase determining means connected to the subtracter.

Brief Description of the Drawings

The above-mentioned and other objects, features and advantages of the present invention will become more apparent from the following detailed description when taken in conjunction with the accompanying drawings, wherein:

FIG. 1 is a block diagram illustrating a first preferred embodiment of the invention;

FIGS. 2a to 2m are waveform diagrams for describing the operation of the embodiment of FIG. 1;

FIG. 3 is a block diagram illustrating on example of the ring oscillator 3 in the embodiment of FIG. 1;

FIG. 4 is a block diagram illustrating one example of the latch 4 in the embodiment of FIG. 1;

DETAILED DESCRIPTION OF THE PREFERRED EMBODIMENTS

Figure 5:
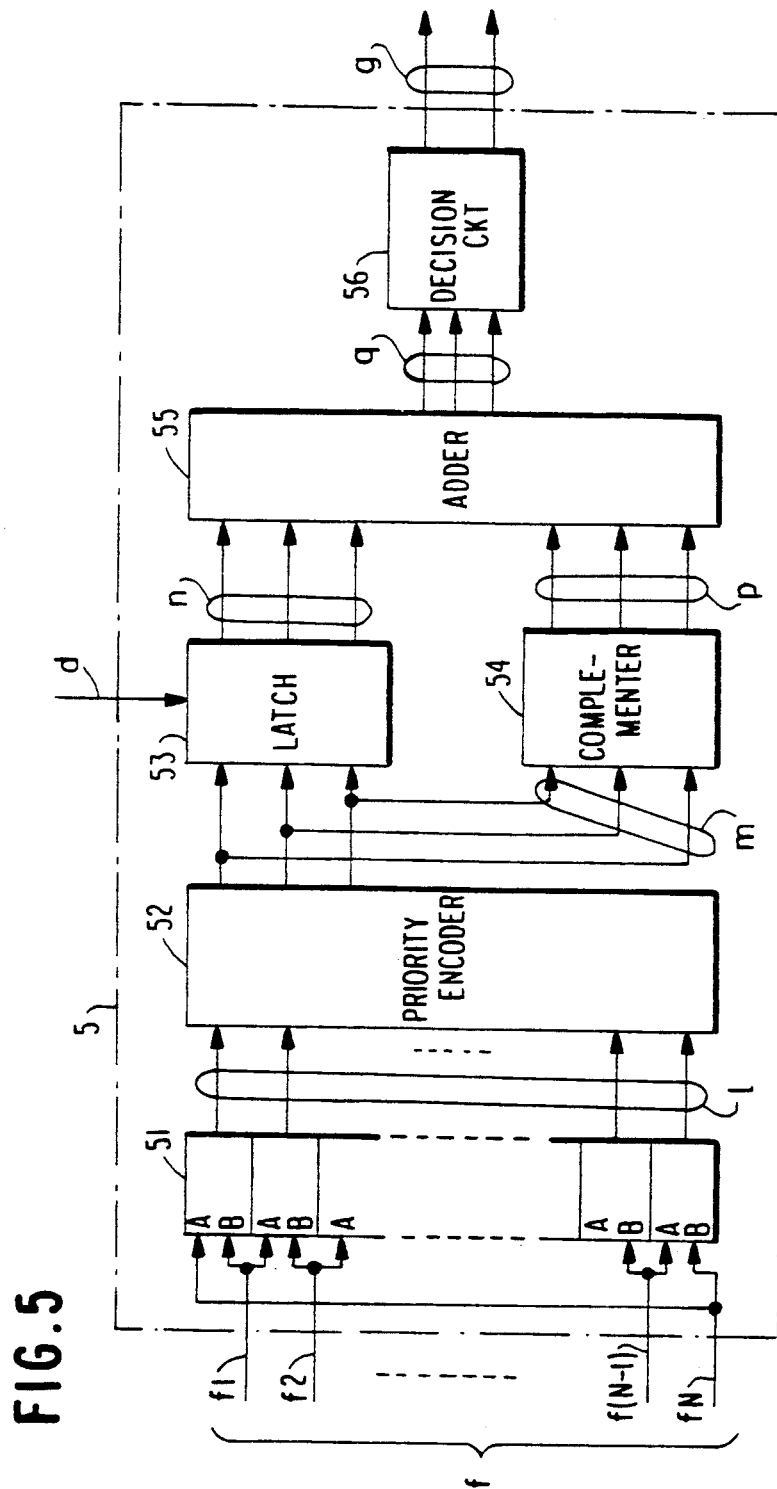
FIG. 5 is a block diagram illustrating one example of the encoder 5 in the embodiment of FIG. 1.

The operation of the PSK signal phase demodulator of the delay detection type will be described below with reference to FIGS. 1 and 2a to 2m.

A PSK signal a (FIG. 2a) is an intermediate frequency (IF) signal resulting from the phase modulation of a carrier with a digital signal or from the conversion of such a modulated carrier into an intermediate frequency, and its phase advances, e.g., by $\pi\frac{3}{4}$ during one baud period T from time t0 till time t3. This PSK signal a is supplied to a zero-cross detector 1, and is converted into a zero-cross signal b (FIG. 2b) which has a logical level of "1" when the voltage level of the PSK signal a is positive or a logical level of "0" when the level is zero or negative. The zero-cross detector 1 can be composed of a logical operation circuit, such as a comparator, by the prior art.

The zero-cross signal b, supplied to a sampler 2 together with an external baud timing signal c, (FIG. 2c) whose cycle is substantially equal to one baud period T of the PSK signal a, and synchronized with the baud timing signal c, is outputted from the sampler 2 as a synchronous baud timing signal d (FIG. 2d). Thus the sampler 2 outputs the synchronous baud timing signal d having a logical level of "1", synchronized with the baud timing signal c at the leading edge t1 of the zero-cross signal b received first after the reception of the baud timing signal c of "1" in logical level. The sampler 2 also turns the logical level of the synchronous baud timing signal d to "0" at the leading edge t2 of the zero-cross signal b received first after the reception of the baud timing signal c of "0" in logical level. In this way, the sampler 2 generates the synchronous baud timing signal d whose cycle is substantially equal to the baud period T. The sampler 2 can be composed of a flip-flop (F/F) which performs edge triggering, such as a D-F/F, i.e. the F/F 21 which receives the zero-cross signal b at the clock terminal and the baud timing signal c at the data terminal and outputs the synchronous baud timing signal d from the output terminal.

The synchronous baud timing signal d is supplied to a latch 4 together with the tap outputs e, i.e. e1, e2, ..., e(N−1), eN of a ring oscillator 3 formed by connecting N delay elements, having substantially the same characteristics, in a ring form. The oscillation frequency f1 of a ring oscillation output i, obtained from the output end of one of the delay elements of the ring oscillator 3, which also is one of the tap outputs e, is represented by $f1 = 1/(N \cdot td)$, where td is the propagation delay time of the delay element. Mutually adjoining tap outputs e, for instance the tap outputs e1 and e2, of the ring oscillator 3 have a phase difference of $2\pi/N$ between them. In FIGS. 2e to 2h, where the tap outputs e1, e2, ..., e6 and e7 are shown with N being equal to 8, the phase difference between the first tap output e1 (FIG. 2e) and the second tap output e2 (FIG. 2f), or between the sixth tap output e6 (FIG. 2g) and the seventh tap output e7 (FIG. 2h), is $\pi/4$. Each delay element of the ring oscillator 3, under control with a delay control signal h, varies the propagation delay time td, and thereby varies the oscillation frequency f1 of the ring oscillator 3. The oscillation frequency f1 is controlled substantially equal to the carrier frequency fm of the PSK signal as described below.

A reference phase oscillator 8 generates a reference phase signal k having an oscillation frequency f0, which is set as close as practicable to the carrier frequency fm of the PSK signal a so as to improve the demodulation accuracy of the PSK signal a. A phase comparator 7, supplied with the reference phase signal k and the ring oscillator output i, compares the phases of the two, and outputs a phase error signal j. What is the most suitable as this phase comparator 7 is a phase frequency detector. The phase error signal j is smoothed by a loop filter 6, and supplied to the ring oscillator 3 as the delay control signal h. These ring oscillator 3, phase comparator 7 and loop filter 6 constitute a phase synchronization loop, and the oscillation frequency f1 of the ring oscillator 3 is phase-synchronized with the reference phase signal k.

The latch 4 latches the tap outputs e (e1, e2, ..., e(N−1), eN) of the ring oscillator 3 each at the leading edge of the synchronous baud timing signal d (time t1 or t4 in FIGS. 2a to 2m to be explained below), and supplies latch outputs f (f1, f2, ..., f(N−1), fN) respectively corresponding to the tap outputs e. Referring now to FIGS. 2i to 2l, the latch outputs f at time t1 of the first baud period are "1" in logical level for f1 (FIG. 2i), f6 (FIG. 2k) and f7 (FIG. 2) and "0" for f2 (FIG. 2j). Meanwhile, at time t4 of the second baud period, following the first, the latch output f6 is "1" in logical level, and the latch outputs f1, f2 and f7 are "0". In FIGS. 2i to 2l, the logical level varies from "1" to "0" in the first baud period between the latch outputs f1 and f2 and in the second baud period between the latch outputs f6 and f7. There is only one point for the logical level of the latch outputs f to vary from "1" to "0" in any single baud period. Here, the latch outputs f are signals latched by the synchronous baud timing signal d having the zero-cross point of the PSK signal a at reference, and at the same time result from the latching of the tap outputs e having $2\pi/N$ phase differences. Therefore, the logical level varying point information represented by the latch outputs f indicates the phase of the PSK signal a in a given baud period with the fineness of $2\pi/N$. Accordingly, the latch outputs f1 and f2 can be used as phase information in the first baud period, and the latch outputs f6 and f7, as phase information in the second baud period. In FIGS. 2i and 2k, there is a phase delay of $5\pi/4$ (or a phase advance of $3\pi/4$) between the latch outputs f1 and f6. Thus, in the PSK signal a, there is a phase advance of $3\pi/4$ between the first and second baud periods.

An encoder 5, which receives the latch outputs f at its input end, first determines the phase of the PSK signal a in the first baud period with reference to the latch outputs f1 and f2 in this first baud period as phase information, then that of the PSK signal a in the second baud period from the latch outputs f6 and f7, and finally calculates the phase differences of the PSK signal a between the first and second baud periods. The encoder 5 further determines the differential phase of the PSK signal a for each baud on the basis of phase difference data in each baud period, and outputs it as a demodulated signal g. If the PSK signal a is a QPSK-modulated signal, the demodulated signal g will be a two-bit digital signal.

Although the leading edge of the zero-cross signal b is the zero-cross point of the PSK signal a in the preferred embodiment illustrated in FIG. 1, the trailing edge can as well be made the zero-cross point instead.

The number of taps of the ring oscillator 3, namely, N determines precision of phase discrimination. However, an increase of N requires more electric power consumption. Thus, N is determined in consideration of quantization noise level and power consumption.

For the baud timing signal extracting circuit for extracting the baud timing signal c, to be supplied to the sampler 2, from the PSK signal a, reference may be made to, for instance, the U.S. Pat. No. 4,680,553. The baud timing signal extracting circuit can consist of a signal extracting circuit having a logarithmic amplifier and a narrow-band band-pass filter as its main constituent elements.

Referring now to FIG. 3, the ring oscillator 3 involved in the preferred embodiment of FIG. 1 is composed by connecting N inverters 31 (31A through 31N) having the same characteristics in a ring form. From the output terminal of each of the inverters 31 is supplied a tap output e (e1, e2, . . . , e(N−1) or eN). From one of the inverters 31 (the inverter 31N in the figure) is supplied the ring oscillation output i. Every inverter 31 has a propagation delay time td equal to tdr+tdf, where tdf is the time taken by the output to turn "0" from "1" in response to the rise of the input from "0" to "1" and tdr, the time taken by the output to turn "0" from "1" in response to the fall of the input from "1" to "0". The oscillation frequency f1 of the ring oscillator 3 equals 1/(td·N). Now, a propagation delay td of the inverter 31 is about 5 ns, if the inverter 31 uses a CMOS technology. Assuming that N is equal to 32 the maximum oscillation frequency f1 of ring oscillator 3 is about 60 MHz. Thus, the maximum carrier frequency fm of PSK signal a is about 60 MHz which is extremely improved compared with that of the conventional phase demodulator described before. To the delay control terminal of each inverter 31 is inputted the delay control signal h to control the propagation delay time td of that particular inverter 31. The power supply terminal of each inverter 31 can be used as the delay control terminal.

Referring next to FIG. 4, the latch 4 involved in the preferred embodiment of FIG. 1 includes N d flip-flops (F/F's) 41 (41A through 41N). To the data terminal of each of the F/F's 41 is fed the corresponding tap output e (one out of e1 through eN). The clock terminal of every F/F 41 is fed with the synchronous baud timing signal d. From the output terminal of each F/F 41 is supplied the latch output f (one out of f1 through fN) resulting from the latching of the corresponding one of the tap outputs e in synchronism with the leading edge of the synchronous baud timing signal d.

Referring to FIG. 5, the encoder 5 involved in the preferred embodiment of FIG. 1 receives the latch outputs f (f1 through fN) at detection gates 51 on the input side. The detection gates 51 receive the latch outputs f corresponding to the tap outputs e, arranged in the sequence of the output phase, in that sequence and detect the logical levels "1" and "0" of mutually adjoining latch outputs f. Thus the detection gates 51 make the detection gate output 1 "1" only when A is "1" and B is "0", A being the first latch output f and B, the next latch output f in the sequence. The detection gates 51 perform the detection of the logical levels "1" and "0" for every one of the N pairs of latch outputs f, and supply N detection gate outputs 1 (l1 through lN). As a result, the detection gates 51 supply the logical level varying point of the latch outputs f, in other words the phase information of the PSK signal a at time t1, in terms of the logical level "1" of the detection gate outputs 1. This logical level varying point is located between the latch outputs f1 and f2 at time t1 in FIGS. 2a to 2m.

The output 1 of the N parallel detection gates are fed in parallel to a priority encoder 52, which receives the detection gate outputs 1 at its N input terminals having an order of priority among them, and detects the input terminals having received detection gate outputs 1 of "1" in logical level. The order of priority may begin with any of the N detection gate outputs 1, but the sequence in which the detection gate outputs 1 are arranged should be fixed. The priority encoder 5 selects the terminal highest in priority among the terminal to which the outputs of "1" in logical level are inputted, and outputs the terminal number m of this terminal, encoded into a parallel digital signal. Where N is 8, the terminal number signal m is a three-bit parallel signal. The terminal number signal m is an output signal resulting from the phase demodulation of the PSK signal a. The terminal number signal m is branched, and one branch is supplied to a latch 53 while the other is fed to a complementer 54.

The terminal number signal m, obtained as the output of the priority encoder 52, is latched by the latch 53 with the synchronous baud timing signal d to become a delayed terminal number signal n, delayed by one baud period. This delayed terminal number signal n is converted by the complementer 54 into the complement of the terminal number signal m to become a complementary signal p.

The delayed terminal number signal n and the complementary signal p are added by an adder 55, and the difference between the delayed terminal number signal n, which is the phase information of the PSK signal a ahead by one baud period, and the terminal number signal m, which is the phase information of the PSK signal a of the current baud period, is calculated to give a differential phase q from the output of the adder 55. The differential phase q is entered into a decision circuit 56 to determine the differential phase region. The determined differential phase region is the delayed demodulated output of the PSK signal a.

Figure 6:
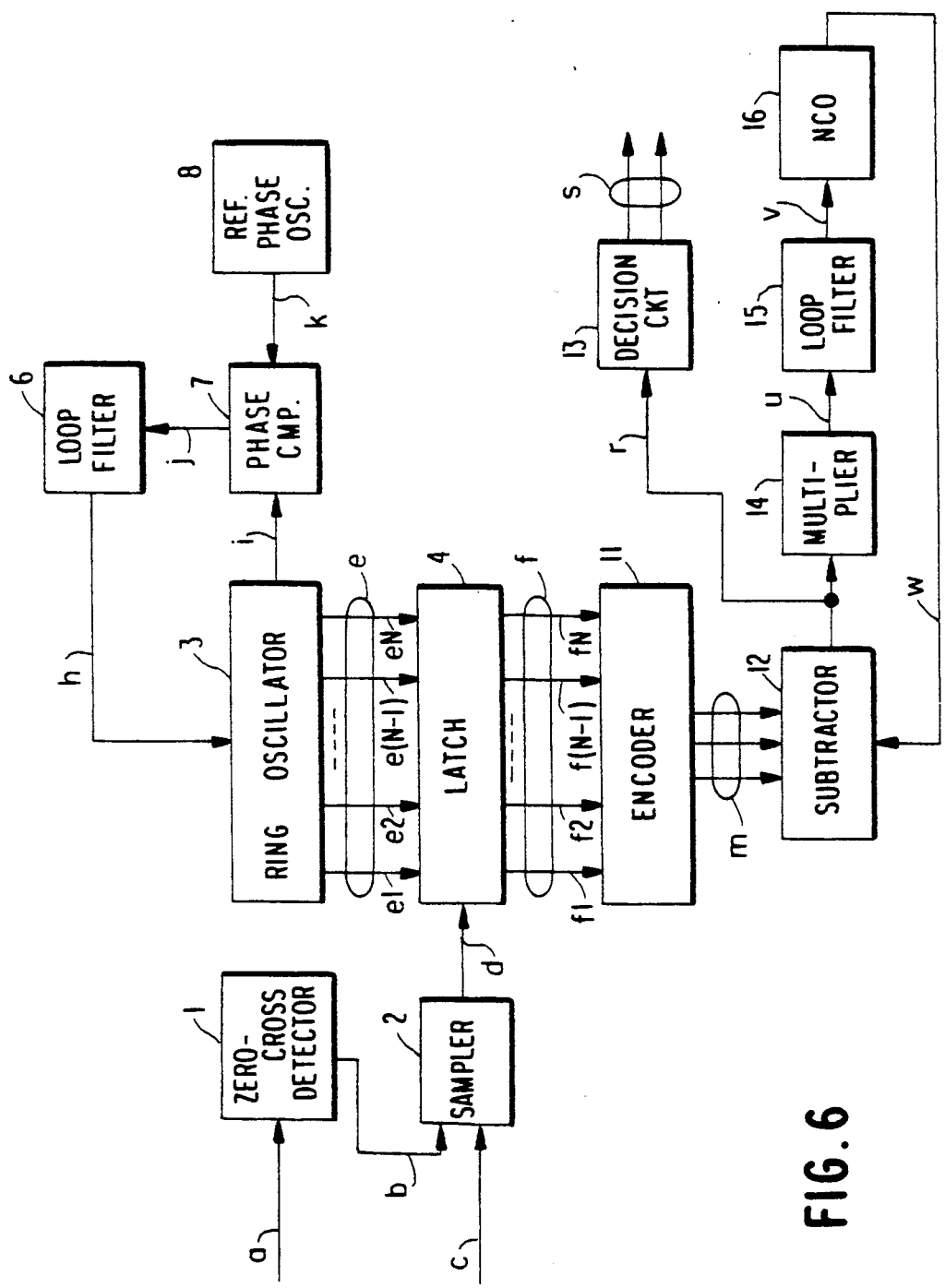
FIG. 6 is a block diagram illustrating a second preferred embodiment of the invention.

Referring now to FIG. 6, another preferred embodiment of the present invention, or a PSK signal phase demodulator of the synchronous detection type, includes an encoder 11, a subtracter 12, a decision circuit 13, a multiplier 14, a loop filter 15 and a numerical control oscillator (NCO) 16 in addition to the zero-cross detector 1, the sampler 2, the ring oscillator 3, the latch 4, the loop filter 6, the phase comparator 7 and the reference oscillator 8 of the phase demodulator, which is the first preferred embodiment illustrated in FIG. 1. This phase demodulator is supplied with PSK signals a and baud timing signals c, performs the same signal processing as the phase demodulator of FIG. 1, and supplies latch outputs e (e1 through eN) from the latch 4. The ring oscillator 3 is also synchronized with the reference oscillator 8. Since all the constituent elements involved in the embodiment of FIG. 6 in addition to the circuitry of the embodiment of FIG. 1 subject signals to digital processing, description without reference to that respect is dispensed with here.

The encoder 11 connected to the latch 4 has the functions of both the detection gates 51 and the priority encoder 52 shown in FIG. 5. Thus the encoder 11 is supplied with latch outputs f, and outputs terminal number signals m respectively corresponding to the output phases of the tap outputs e (e1 through eN) of the ring oscillator 3.

The subtracter 12 connected to the encoder 11 subtracts an offset phase w from the terminal number signals m, determines the reference phase of the "tentative demodulation phase" of the PSK signals a indicated by the terminal number signals m, and outputs the resultant demodulated signals r. The multiplier 12, which receives the output of the subtracter 12, multiplies the demodulated signals r by the number of modulated phases of the PSK signals a, and outputs a phase error signal u which results from the elimination of phase information from the demodulated signals r. If, for instance, the PSK signals a are a QPSK modulated carrier, the multiplier 14 will multiply the demodulated signals r by four. The loop filter 15, into which the phase error signal u is entered, smoothes this signal u into a frequency control signal v. The NCO 16, receiving the frequency control signal v as its input, integrates it into the offset phase w. Thus the offset phase w indicates the regular phase error at the time when the PSK signals a have been phase-demodulated to give the demodulated signals r. The offset phase w, as stated above, is made the subtrahend input to the subtracter 12. In this way, the subtractor 12, the multiplier 14, the loop filter 15 and the NCO 16 constitute a synchrouous phase fixing circuit for fixing the reference phase of the input PSK signals a from the demodulated signals r.

The terminal number signals m from the encoder 11 are entered into the subtracter 12 together with the offset phase w, and the results of the subtraction between them become the demodulated signals r. The decision circuit 12 determines the phase region of the demodulated signals r entered in individual baud periods, and outputs the resultant demodulated signals s.

As is evident from the foregoing, the PSK signal phase demodulator either of the delay detection type or the synchronous detection type according to the present invention involves no analog control means and therefore permits ready circuit integration. It is suitable not only for the reception of high speed digital signals but also for use in portable radio apparatuses which have to be compact and consume less electric power.

What is claimed is:

1. A phase demodulator of the differential detection type comprising:
   zero-cross detecting means for detecting, from a PSK signal transmitted over a transmission path, a zero-cross point at which the amplitude of this PSK signal crosses the reference voltage, and generating a zero-cross point indicating signal;
   sampling means for receiving at its input end a baud timing signal together with said zero-cross point indicating signal, and generating a synchronous baud timing signal synchronized with said zero-cross point indicating signal;
   a ring oscillator comprising N (N is a natural number) delay elements connected in a ring form and providing a delay time varying in response to a control signal, and having tap outputs, each pair of mutually adjoining output ends having a phase difference of $2\pi/N$, and an oscillating frequency substantially equal to the carrier frequency of said PSK signal;
   latching means for latching each of said tap outputs at the logical level varying point of said synchronous baud timing signal, and generating latch outputs, each corresponding to one or another of said N tap outputs; and
   an encoder for detecting in each baud period the logical level varying point at which the logical level varies between each pair of mutually adjoining ones among sequentially arranged said N latch outputs, and encoding information on these logical level varying points.

2. A phase demodulator, as claimed in claim 1, further including:
   a reference phase oscillator for generating a reference phase signal whose frequency is approximately equal to the carrier frequency of said PSK signals;
   phase comparator means responsive to the phase difference between the oscillation output from the output end of one of the delay elements of said ring oscillator and said reference phase signal for generating a phase error signal; and
   a loop filter for smoothing said phase error signal into a delay control signal, wherein
   the oscillation frequency of said ring oscillator is made identical with said reference phase signal by using said delay control signal.

3. A phase demodulator, as claimed in claim 1, wherein said zero-cross point indicating signal has a certain amplitude in one of the periods in which the amplitude of said PSK signal is positive or negative and has no amplitude in the other period.

4. A phase demodulator, as claimed in claim 1, wherein said sampling means includes a flip-flop circuit which receives said zero-cross point indicating signal as a clock signal and said baud timing signal as its data input, and generates said synchronous baud timing signal as its data output.

5. A phase demodulator, as claimed in claim 1, wherein said ring oscillator has an odd number of inverters connected in a ring form and said tap output is supplied from the output end of each of these inverters.

6. A phase demodulator, as claimed in claim 2, wherein said ring oscillator has an odd number of inverters connected in a ring form and said tap output is supplied from the output end of each of said inverters.

7. A phase demodulator, as claimed in claim 6, wherein the power supply terminal of each of said inverters also serves as an input terminal for said delay control signal.

8. A phase demodulator, as claimed in claim 1, wherein said latching means includes N flip-flop circuits which receive said synchronous baud timing signal as a clock signal and one of said tap outputs as said data input, and generate each output of said latching means as data output.

9. A phase demodulator, as claimed in claim 1, wherein said encoder includes means for detecting said logical level varying point in each of said baud periods and supplying the results of the detection, converted into digital signals;
   a subtracter for subtracting from said digital signal of a first baud period said digital signal of a second baud period following the first; and
   a decision circuit for determining the phase region of the output of said subtracter.

10. A phase demodulator, as claimed in claim 2, wherein said encoder includes means for detecting said logical level varying point in each of said baud periods and supplying the phase information represented by those logical level varying points, converted into digital signals;
   a subtracter for subtracting from said digital signal of a first baud period said digital signal of a second baud period following the first; and
   a decision circuit for determining the phase region of the output of said subtracter.

11. A phase demodulator of the synchronous detection type comprising:
   zero-cross detecting means for detecting, from a PSK signal transmitted over a transmission path, a zero-cross point at which the amplitude of this PSK signal crosses the reference potential, and generating a zero-cross point indicating signal;
   sampling means for receiving at its input end a baud timing signal together with said zero-cross point indicating signal, and generating a synchronous baud timing signal synchronized with said zero-cross point indicating signal;
   a ring oscillator comprising N (N is a natural number) delay elements connected in a ring form and providing a delay time varying in response to a control signal, and having tap outputs, each pair of mutually adjoining output ends having a phase difference of $2\pi/N$, and an oscillating frequency substantially equal to the carrier frequency of said PSK signal;
   latching means for latching each of said tap outputs at the logical level varying point of said synchronous baud timing signal, and generating latch outputs, each corresponding to one or another of said N tap outputs;
   means for detecting in each of said baud periods said logical level varying point, and converting phase information represented by said logical level varying points into digital signals;
   a subtracter for subtracting from said digital signal representing said phase information of a first baud period said digital signal representing said phase information of a second baud period following the first;
   a decision circuit for determining the phase region of the output of said subtracter; and
   means for generating from each of said digital signals representing said phase information an offset signal representing the phase error of that signal.

12. A phase demodulator, as claimed in claim 11, further including:
   a reference phase oscillator for generating a reference phase signal whose frequency is approximately M (M is a natural number including 1) times the carrier frequency of said PSK signals;
   phase comparator means responsive to the phase difference between the oscillation output from the output end of one of the delay elements of said ring oscillator and said reference phase signal for generating a phase error signal; and
   a loop filter for smoothing said phase error signal into a delay control signal, wherein
   the oscillation frequency of said ring oscillator is made identical with said reference phase signal by using said delay control signal.

13. A phase demodulator, as claimed in claim 11, wherein said zero-cross point indicating signal has a certain amplitude in one of the periods in which the amplitude of said PSK signal is positive or negative and has no amplitude in the other period.

14. A phase demodulator, as claimed in claim 11, wherein said sampling means includes a flip-flop circuit which receives said zero-cross point indicating signal as a clock signal and said baud timing signal as its data input, and generates said synchronous baud timing signal as its data output.

15. A phase demodulator, as claimed in claim 11, wherein said ring oscillator has an odd number of inverters connected in a ring form and said tap output is supplied from the output end of each of these inverters.

16. A phase demodulator, as claimed in claim 12, wherein said ring oscillator has an odd number of inverters connected in a ring form and said tap output is supplied from the output end of each of said inverters.

17. A phase demodulator, as claimed in claim 16, wherein the power supply terminal of each of said inverters also serves as an input terminal for said delay control signal.

18. A phase demodulator, as claimed in claim 11, wherein said latching means includes N flip-flop circuits which receive said synchronous baud timing signal as a clock signal and one of said tap outputs as said data input, and generate each output of said latching means as data output.

19. A phase demodulator, as claimed in claim 11, wherein said offset signal generating means includes a multiplier for multiplying the output of said subtracter by the number of modulated phases of said PSK signals into a phase error signal;
   a loop filter for smoothing said phase error signal into a frequency control signal; and
   a numerical control oscillator for generating said offset signal by integrating said frequency control signal.

20. A phase demodulator, as claimed in claim 12, wherein said offset signal generating means includes a multiplier for multiplying the output of said subtracter by the number of modulated phases of said PSK signals into a phase error signal;
   a loop filter for smoothing said phase error signal into a frequency control signal; and
   a numerical control oscillator for generating said offset signal by integrating said frequency control signal.

* * * * *